United States Patent
Lee

(10) Patent No.: US 6,738,925 B1
(45) Date of Patent: May 18, 2004

(54) COMPUTER SYSTEM INCLUDING A MEMORY HAVING SYSTEM INFORMATION STORED THEREIN AND A REPAIRING TECHNIQUE THEREFOR

(75) Inventor: Sang-Jin Lee, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 727 days.

(21) Appl. No.: 09/318,980

(22) Filed: May 26, 1999

Related U.S. Application Data

(63) Continuation-in-part of application No. 08/785,974, filed on Jan. 22, 1997, now abandoned.

(30) Foreign Application Priority Data

Mar. 20, 1996 (KR) .............................................. 967582

(51) Int. Cl.[7] .................................................. H02K 3/05
(52) U.S. Cl. ......................................... 714/10; 714/25
(58) Field of Search .............................. 714/2, 25, 36, 714/5, 6, 7, 10, 42

(56) References Cited

U.S. PATENT DOCUMENTS

| | | | |
|---|---|---|---|
| 3,733,587 A | | 5/1973 | Lloyd et al. |
| 4,591,967 A | * | 5/1986 | Mattes et al. ................... 700/3 |
| 4,713,758 A | | 12/1987 | De Kelaita et al. |
| 4,736,374 A | | 4/1988 | Kump et al. |
| 4,760,330 A | | 7/1988 | Lias, Jr. |
| 4,899,306 A | | 2/1990 | Greer |
| 4,912,711 A | | 3/1990 | Shiramizu |
| 5,022,028 A | | 6/1991 | Edmonds et al. |
| 5,224,154 A | * | 6/1993 | Aldridge et al. ......... 379/93.36 |
| 5,305,206 A | * | 4/1994 | Inoue et al. ................. 707/531 |
| 5,438,528 A | | 8/1995 | Emerson et al. |
| 5,488,454 A | | 1/1996 | Fukada et al. |
| 5,732,268 A | | 3/1998 | Bizzarri |
| 5,867,223 A | * | 2/1999 | Schindler et al. ........... 348/552 |

* cited by examiner

Primary Examiner—Dieu-Minh Le
(74) Attorney, Agent, or Firm—Robert E. Bushnell, Esq.

(57) ABSTRACT

An improved repair technique for repairing a computer via a computer communication network automatically transfers stored system information particulars upon a request of a host computer of a service center. The computer includes a central processing unit(CPU) for processing application programs; a read only memory(ROM) for storing programs which initialize and test the computer when the computer is turned on; a second memory for storing system information therein; a monitor for displaying information which is manipulated by the programs; and a modem for transferring the stored system information to a host computer upon a request of the host computer via a communication network.

16 Claims, 5 Drawing Sheets

FIG. 3

| Offset | Field |
|---|---|
| 0 | MODEL Number |
| 15 | |
| 16 | CPU TYPE |
| 17 | MEMORY SIZE |
| 18 | KEYBOARD # |
| 19 | MOUSE # |
| 20 | VIDEO # |
| 21 | MODEM # |
| 22 | SOUND # |
| 23 | NETWORK I/F # |
| 24 | MPEG # |
| 25 | ⋮ |

COMPUTER SYSTEM INCLUDING A MEMORY HAVING SYSTEM INFORMATION STORED THEREIN AND A REPAIRING TECHNIQUE THEREFOR

CROSS-REFERENCE TO RELATED APPLICATIONS

This application is a continuation-in-part of applicant's Ser. No. 08/785,974, filed in the U.S. Patent & Trademark Office on Jan. 22, 1997 now abandoned.

CLAIM OF PRIORITY

This application makes claims all benefits accruing under 35 U.S.C. §§119 and 120 from an application for A COMPUTER SYSTEM HAVING A MEMORY RECORDED WITH SYSTEM INFORMATION, A REPAIRING SYSTEM AND A REPAIRING METHOD THEREFOR earlier filed in the Korean Industrial Property Office on Mar. 20, 1996 and there duly assigned Serial No. 7582/1996.

BACKGROUND OF THE INVENTION

1. Field of the Invention

The present invention relates to a computer including a memory having system information stored therein, a repair system and a repair method therefor, using a computer communication network. More particularly this invention relates to a computer, the particular system information stored on a memory of the computer during the manufacture of the computer, and the use of that stored system information in repair of the computer system by transferring the stored system information to a host computer of a service center via a computer communication network.

2. Description of the Related Art

Nowadays, as the computer system is generally used in almost all fields of society and the mass production of computers has been introduced in the industry. Therefore, the subsequent maintenance of the computer is indispensable in the computer sales market. In this circumstance, it is my belief that a technique for repairing the computer via a computer communication network is suggested as an useful and prompt technique to reduce the cost of maintaining the computer.

In earlier repair techniques, a host computer having programs or requiring information for repair of a used computer is connected to the computer requiring repair via first and second modems and a telephone line extending between the modems. If the user's computer has a problem, the user connects the user computer with the host computer in the service center via the first and second modems and the telephone line. The user computer sends the problem information via the second modem on the request of the host computer. The host computer receives the problem information via the first modem and analyzes the problem and then transfers repair information or repair programs to the user's computer. In this system however, the user must send the information regarding the user's computer system to the host computer to enable a proper repair. I have noticed that unfortunately, the user often does not know the essential particulars of the system information, such as the type of video card, the type, size and capacity of the hard disk, the size of the random access memory (RAM), and type of central processing unit (CPU), among other items of information about the user's computer. I have noticed that this makes the proper repair of the computer difficult and sometimes makes the repair of the computer via a computer communication network impossible.

Representative exemplars of efforts in the art to design systems for repair of malfunctioning computers include U.S. Pat. No. 5,488,454 to Fukada et al., entitled Control Of Equipment And Of Communication With Plural Units Of Equipment, U.S. Pat. No. 5,022,028 to Edmonds et al., entitled Software Verification Apparatus, U.S. Pat. No. 4,912,711 to Shiramizu, entitled Diagnosing Apparatus Capable Of Readily Diagnosing Failures Of A Computer System, U.S. Pat. No. 4,899,306 to Greer, entitled Test Interface Circuit Which Generates Different Interface Control Signals For Different Target Computers Responding To Control Signals From Host Computer, U.S. Pat. No. 4,760,330 to Lias Jr., entitled Test System With Shared Test Instruments, U.S. Pat. No. 4,713,758 to De Kelaita et al., entitled Computer Testing Arrangement, and U.S. Pat. No. 3,733,587 to Lloyd et al., entitled Universal Buffer Interface For Computer Controlled Test Systems. I have found that these efforts do not provide effective systems.

SUMMARY OF THE INVENTION

A principle object of the present invention is to provide an improved computer system.

It is another object to provide a computer system capable of transferring system information and other particulars of the computer automatically on the request of a host computer via a computer communication network.

It is still another object to provide an improved repair system using the computer system described below on a computer communication network.

It is a further object to provide an improved repair method of the computer by using a second memory for transferring system information and other particulars of the malfunctioning computer via a computer communication network.

According to the present invention, the computer system may be constructed with a central processing unit(CPU) for processing application programs; a read only memory (ROM) for storing programs which initialize and test the computer system when the computer system is turned on; a second memory for storing system information; a monitor for displaying information which is manipulated by the programs; and a modem for transferring the system information to a host computer on a request of the host computer via a communication network.

In accordance with another aspect of the present invention, a repair system for the computer comprises a user's computer including a memory having system information stored therein and a first modem connected to said user's computer for transferring the system information. In addition, the system includes a second modem connected to said first modem for receiving the system information, and a host computer connected to said second modem for analyzing conditions of said user's computer and for sending a system repair program to said user's computer according to the system information. The repair program includes test programs for testing the user's computer and helpful repair information regarding the problem with the user's computer.

One significant advantage of the present invention is that the user's computer system allows a host computer to automatically know the system information particulars thereof In accordance with another aspect of the present invention, a repair method for a computer system includes the steps of connecting a user's computer with a host computer via a computer communication network; transferring system information stored in a memory of the user's computer from the user's computer to the host computer on the request of the host computer; transferring repair programs according to the system information from the host computer to the user's computer; and repairing the user's computer with the repair program.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 shows a structure of the memory containing typical system information frequently used in the practice of this invention;

DETAILED DESCRIPTION OF THE PREFERRED EMBODIMENTS

Figure 1:
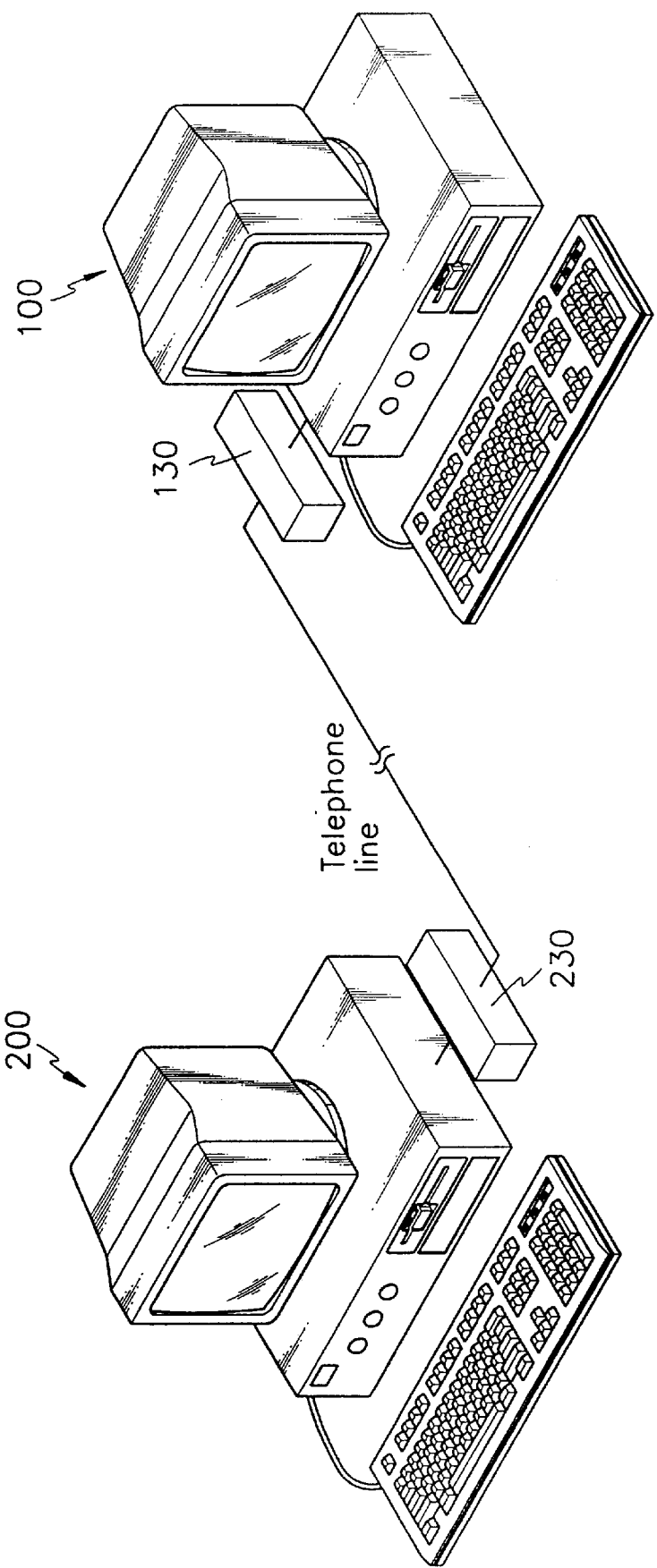
FIG. 1 is a hypothetical representation showing an earlier computer repair system which operates via a computer communication network.

Turning now to the drawings, FIG. 1, shows an earlier repair technique includes a host computer 200 which has programs or information for repairing a user's computer 100, the user's computer 100 having a problem requiring repair, and a first modem 230 which is connected to the host computer 200 and a second modem 130 which is connected to the user's computer 100 for transferring the information about the problem, repair programs and repair information between the host computer 200 and the user's computer 100.

If the user's computer 100 has a problem, the user connects the user's computer 100 with the host computer 200 in the service center via the first modem 230 and the second modem 130. The user's computer 100 sends the problem information via the second modem 130 on the request of the host computer 200. The host computer 200 receives the problem information via the first modem 230 and analyzes the problems and transfers repair information or repair programs to the user's computer 100. But in this system, the user must send the information regarding his/her computer system to the host computer 200 for enabling a proper repair. Usually, the user does not know the system information particulars, such as the type of video card, hard disk, RAM and CPU etc, of his/her own computer. This makes the proper repair of the computer difficult and sometimes makes the repair of the computer via a computer communication network impossible.

Figure 2B:
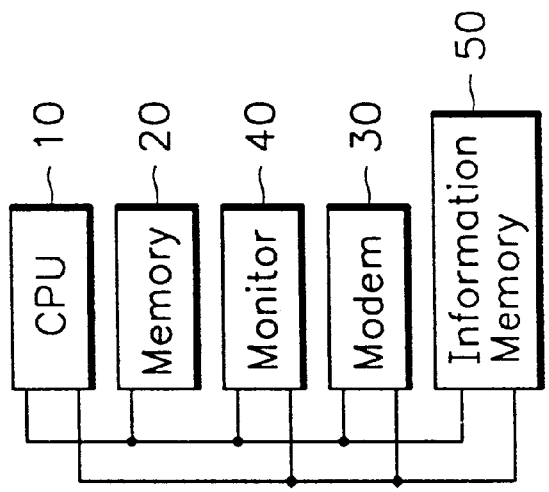
FIGS. 2A and 2B together show the configuration of a computer system constructed as an embodiment of the present invention.
Figure 2A:
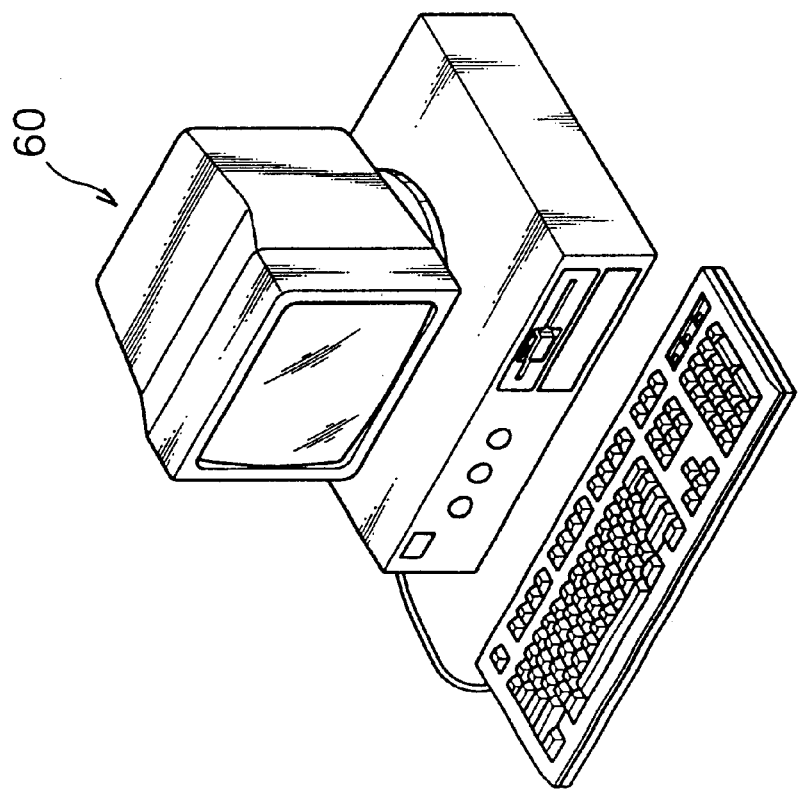

As shown in FIGS. 2A and 2B, a computer system of this invention includes a central processing unit 10 (CPU) for processing application programs and a monitor 40 for displaying information which is manipulated by the programs. In this embodiment, a memory 20 is provided for storing programs which initialize and test the computer system when the computer system is turned on. System information is stored in a separate information memory 50. A modem 30 is provided for transferring the system information to a host computer on a request of the host computer via a communication network. Generally, computer systems have the central processing unit, the memory for storing programs which initialize and test the computer system, the monitor for displaying information which is manipulated by the programs, and the modem for computer communication. But in the present invention, the computer system further includes the information memory 50; this system information is stored in the memory 50 during the manufacture of the computer.

FIG. 3 shows a detailed structure of the memory containing system information. As the system information, a model or serial number of the computer, memory size, type of CPU, type of keyboard, video card, modem, sound card, MPEG card and the type of network interface are stored in the memory. The model number of the computer and serial number of the computer are normally fixed and the memory is normally arranged so that they cannot be changed. However, the other items may change due to upgrading of the computer and the memory is arranged so as to allow the information to be updated. Any other system information useful for repairing the computer can be stored in the memory. The information memory 50 is a memory selected from the group consisting of EPROMs (erasable, programmable read only memories), EEPROMs (electrically erasable, programmable read only memories) and flash memory in this embodiment. But the memory 50 includes any kind of memory, preferably a read only memory.

Figure 4:
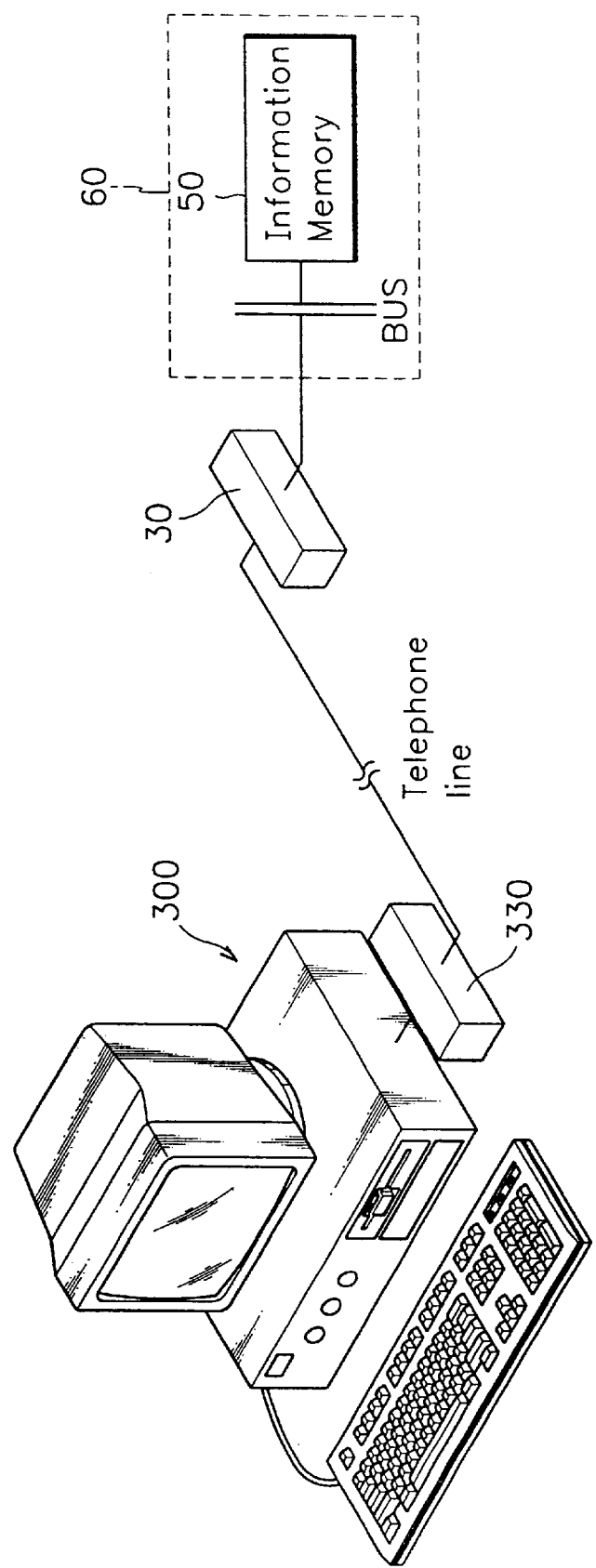
FIG. 4 shows a repair system which operates via a computer communication network in accordance with the practice of the present invention.

FIG. 4 shows a repair system which operates via a computer communication network in accordance with the present invention. The element designated by reference numeral 60 is a part of the user's computer. As shown in FIG. 4, the repair system for a computer according to the present invention comprises a user's computer 60 including an information memory 50 having system information recorded therein and a first modem 30 connected to said user's computer 60 for transferring the system information. A BUS interface (not shown in FIG. 4) is used for transferring the system information to the modem. A second modem 330 is connected to the first modem 30 through the communication line, such as telephone line, for receiving the system information, and a host computer 300 is connected to said second modem 330 for analyzing conditions of said user's computer and for sending a system repair program to said user's computer according to the system information.

Figure 5:
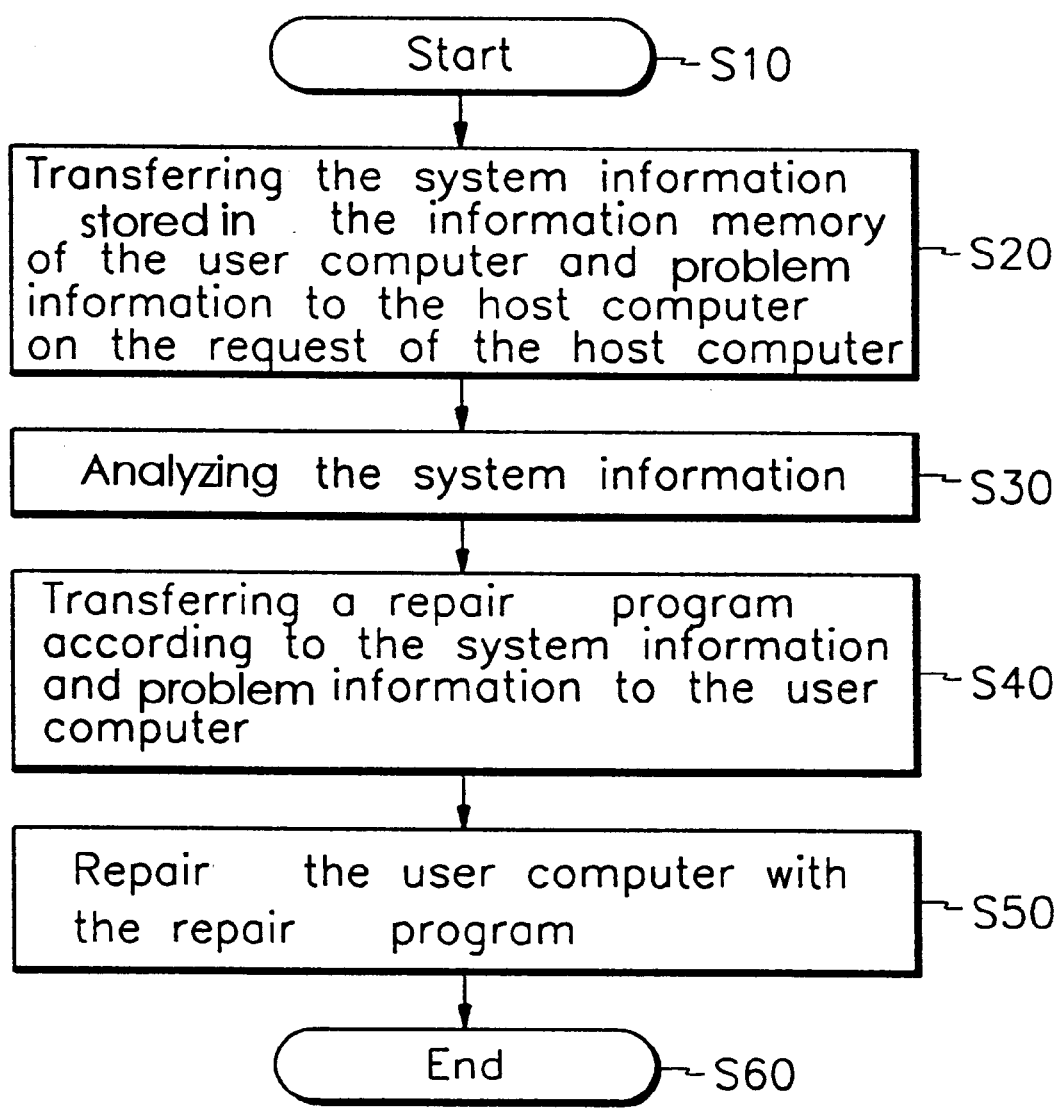
FIG. 5 is a flowchart showing the process of the operation of the repair system which operates via a computer communication network in accordance with the principles of the present invention.

FIG. 5 is a flowchart showing the process of the operation of the repair system via a computer communication network in accordance with the present invention. As shown in FIG. 5, the repair method for a computer system includes the steps of connecting a user's computer 60 with a host computer 300 via a computer communication network (S10) when the user's computer 60 has a problem. The next step is transferring the system information stored in the information memory 50 of the user's computer 60 to the host computer 300 on the request of the host computer 300 (S20). At this stage, the information regarding the problem can be transferred to the host computer 300. The host computer 300 analyzes the system information (S30) and transfers a repair program according to the system information and problem information to the user's computer (S40). The repair program includes test programs for testing the user's computer and helpful repair information regarding the problem. The next step is repairing or testing the user's computer 60 with the repair program or test program (S50). Finally, the user's computer 60 is disconnected from the host computer 300

(S60). In above described process, the host computer 300 can transfer the test program, and receive the test result from the user's computer 60 and then send the repair program according to the test result. With the present invention, the host computer automatically receives the system information particulars of the user's computer for enabling the repair of the user's computer. This makes the repair process easy and accurate. This invention can be applied to the repair of any electronic apparatus via a computer communication network.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer, comprising:
   a central processing unit for processing application programs;
   a first memory for storing programs which initialize and test the computer when the computer is turned on;
   a second memory having system information stored therein;
   a monitor for displaying information which is manipulated by the programs; and
   a modem for transferring the stored system information to a host computer on a request of the host computer via a communication network.

2. The computer according to claim 1, wherein said second memory is a memory selected from the group consisting of EPROMs (erasable, programmable read only memories), EEPROMs (electrically erasable programmable read only memories) and flash memories.

3. The computer according to claim 2, said second memory storing system information comprising at least one of:
   a model number of the computer;
   a serial number of the computer;
   a memory size;
   a central processing unit type;
   a keyboard type;
   a video card type;
   a moving picture expert group (MPEG) card type;
   a modem type;
   a sound card type; and
   a network interface type.

4. The computer according to claim 3, said second memory being configured such that the model number of the computer and the serial number of the computer are fixed and cannot be changed by a user while the remaining system information may be altered by the user.

5. The computer according to claim 2, said second memory storing system information comprising:
   a model number of the computer;
   a serial number of the computer;
   a memory size of the computer; and
   a central processing unit type of the computer.

6. The computer according to claim 5, said second memory being configured such that the model number of the computer and the serial number of the computer are fixed and cannot be changed by a user while the remaining system information may be altered by the user.

7. The computer according to claim 1, said second memory storing system information comprising at least one of:
   a model number of the computer;
   a serial number of the computer;
   a memory size;
   a central processing unit type;
   a keyboard type;
   a video card type;
   a moving picture expert group (MPEG) card type;
   a modem type;
   a sound card type; and
   a network interface type.

8. The computer according to claim 7, said second memory being configured such that the model number of the computer and the serial number of the computer are fixed and cannot be changed by a userwhile the remaining system information may be altered by the user.

9. The computer according to claim 1, said memory storing system information comprising:
   a model number of the computer;
   a serial number of the computer;
   a memory size of the computer; and
   a central processing unit type of the computer.

10. The computer according to claim 9, said second memory being configured such that the model number of the computer and the serial number of the computer are fixed and cannot be changed by a user while the remaining system information may be altered by the user.

11. A repair system for a computer, comprising:
    a user's computer including a memory having system information stored therein;
    a first modem connected to said user's computer for transferring the stored system information;
    a second modem connected to said first modem for receiving the transferred system information; and
    a host computer connected to said second modem for receiving the transferred system information in said first and second modems upon a request of the host computer and for analyzing conditions of said user's computer and for sending a system repair program to said user's computer according to the analyzed conditions and the system information.

12. The repair system according to claim 11, said memory storing system information comprising at least one of:
    a model number of the computer;
    a serial number of the computer;
    a memory size;
    a central processing unit type;
    a keyboard type;
    a video card type;
    a moving picture expert group (MPEG) card type;
    a modem type;
    a sound card type; and
    a network interface type.

13. The computer according to claim 12, said second memory being configured such that the model number of the computer and the serial number of the computer are fixed and cannot be changed by a user while the remaining system information may be altered by the user.

14. The computer according to claim 11, said memory storing system information comprising:

a model number of the computer;

a serial number of the computer;

a memory size of the computer; and a central processing unit type of the computer.

15. The computer according to claim 14, said memory being configured such that the model number of the computer and the serial number of the computer are fixed and cannot be changed by a user while the remaining system information may be altered by the user.

16. A repair method for a computer, comprising the steps of:

connecting a user's computer to a host computer via a computer communication network;

transferring system information stored in a memory of the user's computer from the user's computer to the host computer upon a request of the host computer;

transferring a repair program according to the system information from the host computer to the user's computer; and repairing the user's computer with the repair program.

* * * * *